(12) United States Patent
Shimoyama et al.

(10) Patent No.: US 9,223,024 B2
(45) Date of Patent: Dec. 29, 2015

(54) THREE-DIMENSIONAL MODEL GENERATING DEVICE

(71) Applicant: KABUSHIKI KAISHA TOSHIBA, Tokyo (JP)

(72) Inventors: Kenichi Shimoyama, Tokyo (JP); Akihito Seki, Kanagawa (JP); Satoshi Ito, Kanagawa (JP); Masaki Yamazaki, Tokyo (JP); Yuta Itoh, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 14/072,322

(22) Filed: Nov. 5, 2013

(65) Prior Publication Data
US 2014/0132600 A1    May 15, 2014

(30) Foreign Application Priority Data
Nov. 14, 2012 (JP) .................................. 2012-249859

(51) Int. Cl.
*G01B 11/24* (2006.01)
*G01S 17/42* (2006.01)
*G01S 7/481* (2006.01)

(52) U.S. Cl.
CPC .............. *G01S 17/42* (2013.01); *G01S 7/4817* (2013.01)

(58) Field of Classification Search
CPC .................................. G01B 11/24; G01B 11/30

USPC ........................................................... 356/601
See application file for complete search history.

(56) References Cited

U.S. PATENT DOCUMENTS

2002/0140924 A1* 10/2002 Wangler ................ G01S 7/4802
356/28

FOREIGN PATENT DOCUMENTS

JP    2010-151809    7/2010

* cited by examiner

*Primary Examiner* — Roy M Punnoose
(74) *Attorney, Agent, or Firm* — Nixon & Vanderhye, P.C.

(57) ABSTRACT

An example three-dimensional model generating device includes an emitting unit that emits a laser light and a first deflector that deflects laser light, whose emission direction rotates in a first rotation range, within a first scan plane. A second deflector deflects laser light, whose emission direction rotates in a second rotation range, within a second scan plane intersecting with the first scan plane. The detector detects a reflected light when laser light deflected from the first deflector is reflected from the target object or detects a reflected light when laser light deflected from the second deflector is reflected from the target object. The measuring unit measures a distance to the target object on the basis of the time taken since emission of the laser light to detection of the reflected light. The generating unit generates a three-dimensional model of the target object by using the measurement result.

7 Claims, 7 Drawing Sheets

THREE-DIMENSIONAL MODEL GENERATING DEVICE

CROSS-REFERENCE TO RELATED APPLICATIONS

This application is based upon and claims the benefit of priority from Japanese Patent Application No. 2012-249859, filed on Nov. 14, 2012; the entire contents of which are incorporated herein by reference.

FIELD

An embodiment described herein relates generally to a three-dimensional model generating device.

BACKGROUND

Conventionally, a technology is known for generating a three-dimensional model by measuring the three-dimensional shape of a target object. For example, it is possible to think of a method in which a target object is placed in the center of the measurement direction (the observation direction) of a laser radar device that is capable of measuring the distance to the target object; measurement is performed by moving the laser radar device along the outer circumferential direction of the target object; and the three-dimensional shape of the target object is generated on the basis of the measurement result.

In order to obtain an accurate three-dimensional model, it is particularly important to eliminate omissions in the measurement. However, in a typical laser radar device, the laser light is deflected in a plurality of scan planes having different heights. Hence, if a target object is so thin that it is able to fit within the clearance gaps between adjacent scan planes, then that target object is not detectable by a typical laser radar device. Moreover, since the clearance gaps widen along with an increase in the distance to the target object, the number of undetectable objects also goes on increasing. Thus, in the conventional technology, that leads to omissions in the measurement of the target object for which a three-dimensional model is to be generated. For that reason, it is not possible to obtain an accurate three-dimensional model.

DETAILED DESCRIPTION

According to an embodiment, a three-dimensional model generating device includes an emitting unit, a first deflector, a second deflector, a detector, a measuring unit, and a generating unit. The emitting unit emits a laser light in such a way that an emission direction of the laser light rotates around a predetermined axis. The first deflector deflects at least a part of the laser light, whose emission direction rotates in a first rotation range, within a first scan plane. The second deflector deflects at least a part of the laser light, whose emission direction rotates in a second rotation range, within a second scan plane that intersects with the first scan plane. The detector detects a reflected light when the laser light that has deflected from the first deflector is reflected from a target object or detect a reflected light when the laser light that has deflected from the second deflector is reflected from the target object. The measuring unit measures a distance to the target object on the basis of the amount of time taken since emission of the laser light up to detection of the reflected light. The generating unit generates a three-dimensional model of the target object by using a measurement result obtained by the measuring unit.

Figure 1:
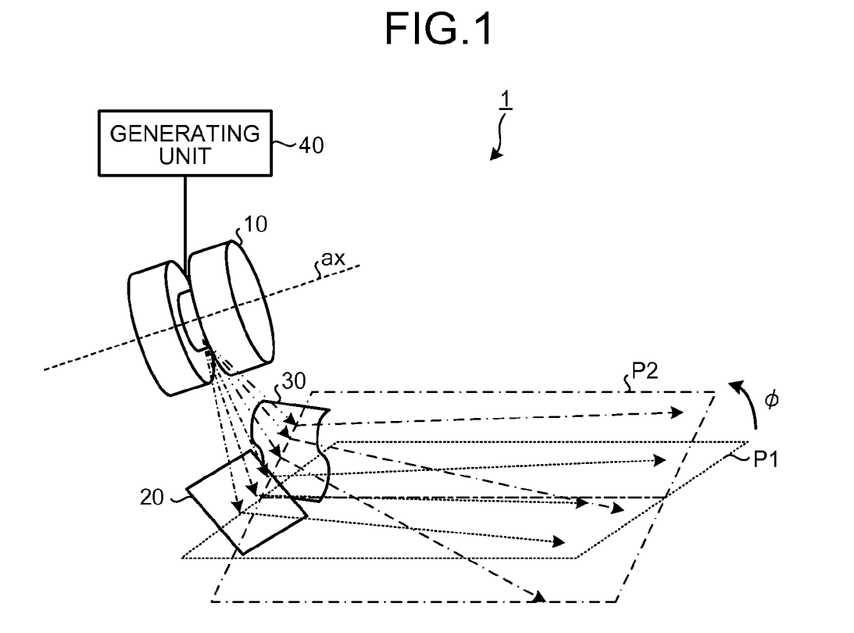
FIG. 1 is a diagram illustrating an overall configuration example of a three-dimensional model generating device according to an embodiment.

An exemplary embodiment of a three-dimensional model generating device will be described below with reference to the accompanying drawings. Herein, a three-dimensional model points to the data that enables expressing the shape of a three-dimensional object. FIG. 1 is a diagram illustrating an overall configuration example of a three-dimensional model generating device 1 according to the embodiment. As illustrated in FIG. 1, the three-dimensional model generating device 1 includes a laser radar unit 10, a first deflecting unit 20, a second deflecting unit 30, and a generating unit 40.

Figure 2:
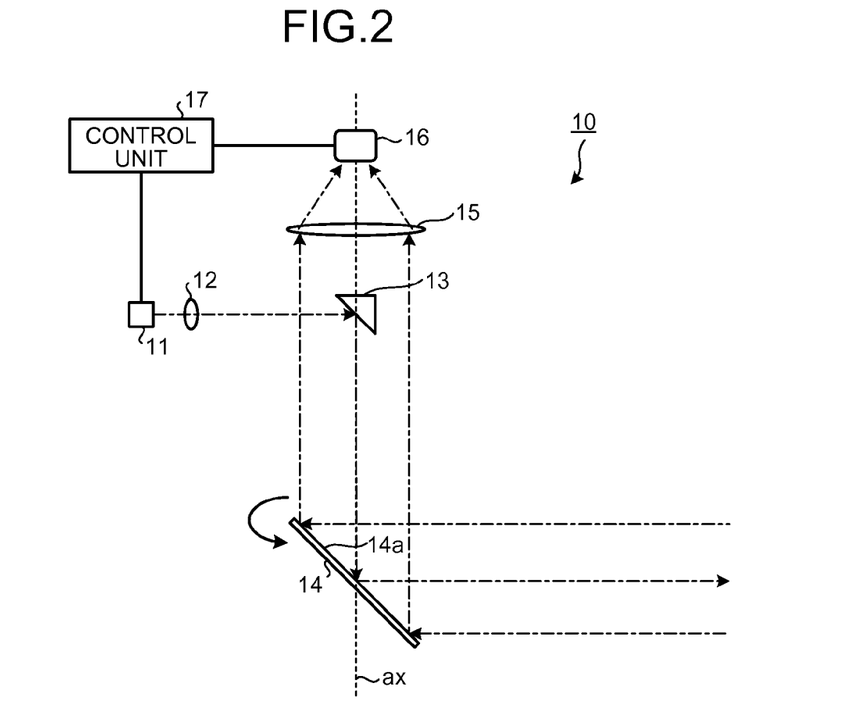
FIG. 2 is a diagram illustrating a configuration example of a laser radar unit according to an embodiment.

The laser radar unit 10 emits a laser light such that the emission direction of the laser light rotates around a predetermined axis (in the example illustrated in FIG. 1, rotates around a light axis ax). FIG. 2 is a diagram illustrating a specific configuration example of the laser radar unit 10. As illustrated in FIG. 2, the laser radar unit 10 includes a laser light generating unit 11, a lens 12, a mirror 13, a deflection plate 14, a collecting lens 15, a detecting unit 16, and a control unit 17. Herein, the laser radar unit 10 has the function of detecting the distance to or the direction toward a target object for which a three-dimensional model is to be generated.

The laser light generating unit 11 is configured with, for example, laser diodes. Under the control of the control unit 17, the laser light generating unit 11 receives the supply of a pulse current from a driver circuit (not illustrated) and projects a pulsed laser light.

The lens 12 is disposed on the light path of the laser light that is projected by the laser light generating unit 11. The lens 12 is configured as a collimated lens; and has the function of converting the laser light, which is projected by the laser light generating unit 11, into a parallel light.

The mirror 13 is disposed on the light path of the laser light that has passed through the lens 12. Herein, the mirror 13 is positioned in such a way that the laser light that has passed through the lens 12 is reflected toward the deflection plate 14.

The deflection plate 14 is configured to be rotatable around the light axis ax, and is disposed on the light path of the laser light that has reflected from the mirror 13. Moreover, the deflection plate 14 has the function of deflecting (reflecting) the laser light, which has reflected from the mirror 13, toward the space in which a target object is present; as well as has the function of deflecting (reflecting) the reflected light from the target object toward the detecting unit 16.

In the example illustrated in FIG. 2, the deflecting plate 14 is placed in such a way that the direction of the laser light that has reflected from the mirror 13 makes an angle of 45° with the normal of a reflecting surface 14a of the deflection plate 14. Moreover, the deflection plate 14 rotates around the light axis ax at which the laser light reflected from the mirror 13 is coincident in direction with the axis direction of the deflection plate 14. Hence, irrespective of the rotational position of the deflection plate 14, the laser light reflected from the mirror 13 is always maintained at an angle of incidence of 45°. As a result, the travelling direction of the laser light that has reflected from the deflection plate 14 is always orthogonal to the light axis ax.

By implementing the configuration described above, it becomes possible to enable emission of a laser light with the emission direction of the laser light rotating around the light axis ax. Meanwhile, under the control of the control unit 17, the deflection plate 14 rotates when driven by a motor (not illustrated). Moreover, the reflecting surface 14a of the deflection plate 14 is configured to be sufficiently larger in size than the size of the area on the mirror 13 from which the laser light is reflected. Meanwhile, in the example illustrated in FIG. 2, each of the laser light generating unit 11, the lens 12, the mirror 13, the deflection plate 14, and the control unit 17 can be regarded to correspond to an "emitting unit" mentioned in claims.

The collecting lens 15 is disposed on the light path of the reflected light between the deflection plate 14 to the detecting unit 16. The collecting lens 15 collects the reflected light from the deflection plate 14 and guides the collected light to the detecting unit 16.

The detecting unit 16 detects the laser light (the reflected light) that has reflected from the target object. The detecting unit 16 is configured with, for example, photodiodes that detect the reflected light from the target object and convert it into electric signals.

The control unit 17 has the function of measuring the distance to the target object by measuring the amount of time taken since the output of the laser light by the laser light generating unit 11 up to the detection of the reflected light by the detecting unit 16. Meanwhile, in this example, the control unit 17 corresponds to a "measuring unit" mentioned in claims.

Returning to the explanation with reference to FIG. 1, the first deflecting unit 20 deflects at least a part of the laser light, which has been emitted by the laser radar unit 10 and whose emission direction rotates in a first rotation range, within a first scan plane P1. In the example illustrated in FIG. 1, the first deflecting unit 20 is configured with a flat reflecting material (such as a mirror or a prism). Herein, the explanation is given for an example in which the first deflecting unit 20 is configured with a mirror. In the embodiment, of the top surface (the reflecting surface) of the first deflecting unit 20, such a position is set as the origin at which falls the laser light present at the center of the first rotation range; and a coordinate system is set in which the travelling direction of the laser light that has deflected from the first deflecting unit 20 serves as the Z-axis, the vertical upward direction serves as the Y-axis, and the horizontal direction orthogonal to the Z-axis serves as the X-axis. However, that is not the only possible case, and the coordinate system can be set by implementing an arbitrary method. Given below is the concrete explanation of the first deflecting unit 20.

In the example illustrated in FIG. 1, the first deflecting unit 20 is disposed in such a way that the laser light in the first rotation range sequentially falls along a line that passes transversely across the top surface of the first deflecting unit 20, and in such a way that the plane that includes a collection of laser light emitted with the emission direction thereof rotating around the light axis ax (i.e., a rotating plane of the laser light) makes an angle of 45° with the normal of the top surface of the first deflecting unit 20.

Figure 3:
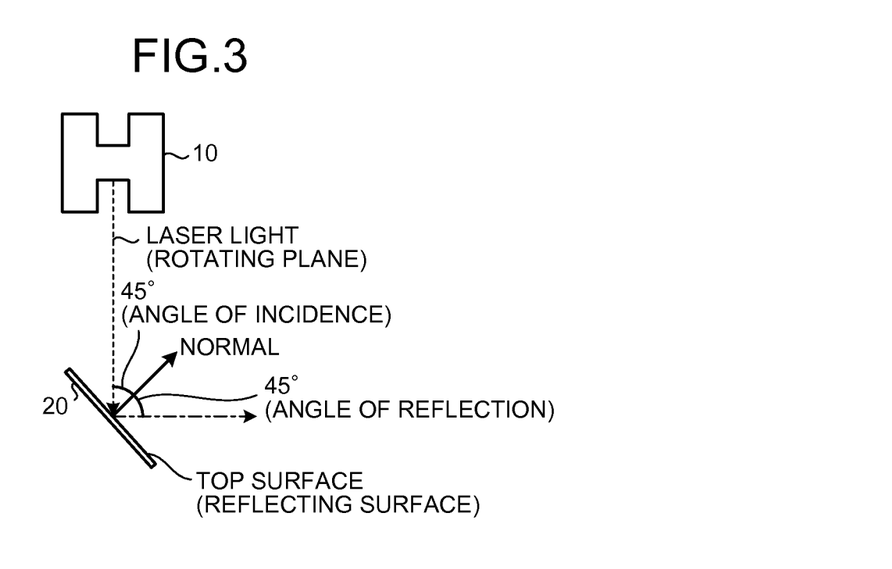
FIG. 3 is a schematic diagram illustrating the laser radar unit and a first deflecting unit according to an embodiment.

FIG. 3 is a schematic diagram (a schematic diagram in the YZ plane) illustrating a case when the laser radar unit 10 and the first deflecting unit 20 are viewed from the X-axis direction. As can be understood from FIG. 3, the first deflecting unit 20 is disposed in such a way that the rotating plane of the laser light makes an angle (an angle of incidence) of 45° with the normal of the top surface of the first deflecting unit 20. With that, the angle of reflection becomes equal to 45°, and the laser light reflected from the top surface of the first deflecting unit 20 travels in a direction perpendicular to the incident direction. That is, the first scan plane P1, which indicates the area in which the laser light travels after being deflected from the first deflecting unit 20, becomes an orthogonal plane to the rotating plane. However, the first scan plane P1 is not limited to this particular form.

Returning to the explanation with reference to FIG. 1, the second deflecting unit 30 deflects at least a part of the laser light, which has been emitted by the laser radar unit 10 and whose emission direction rotates in a second rotation range, within a second scan plane P2 that intersects with the first scan plane P1 (in the example illustrated in FIG. 1, intersects at an angle Φ). The second deflecting unit 30 is configured with a reflecting material such as a mirror or a prism. Herein, the explanation is given for an example in which the second deflecting unit 30 is configured with a mirror. Given below is the concrete explanation of the second deflecting unit 30.

Figure 4:
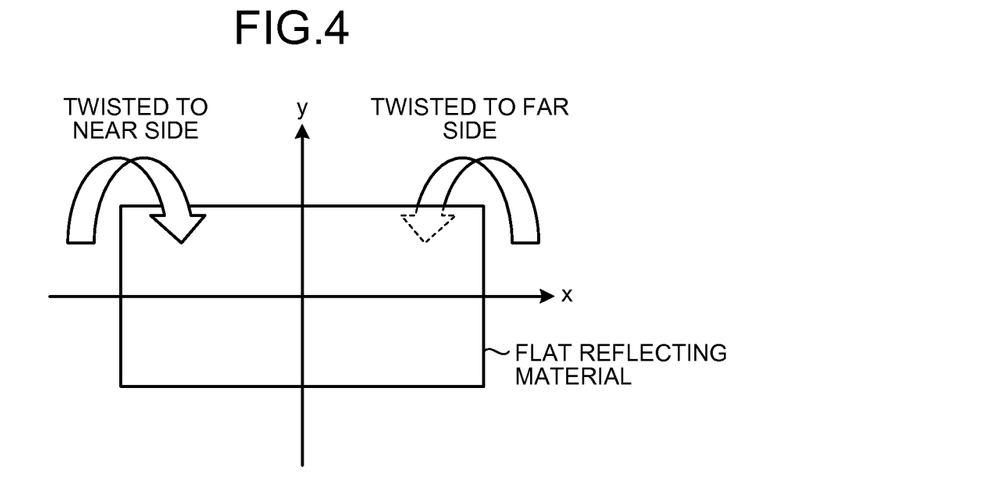
FIG. 4 is front view of a flat reflecting material from which a second deflecting unit according to the embodiment is formed.
Figure 5:
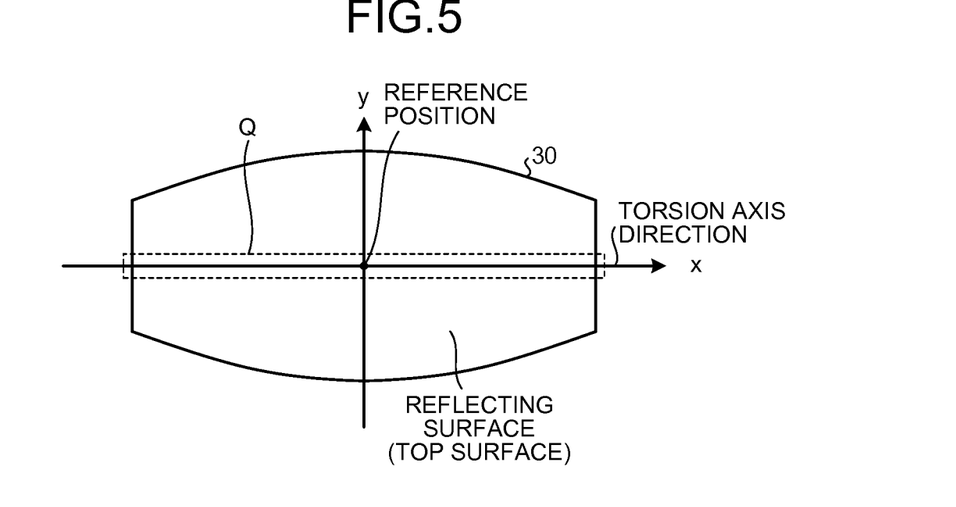
FIG. 5 is a front view of the second deflecting unit according to the embodiment.
Figure 6:
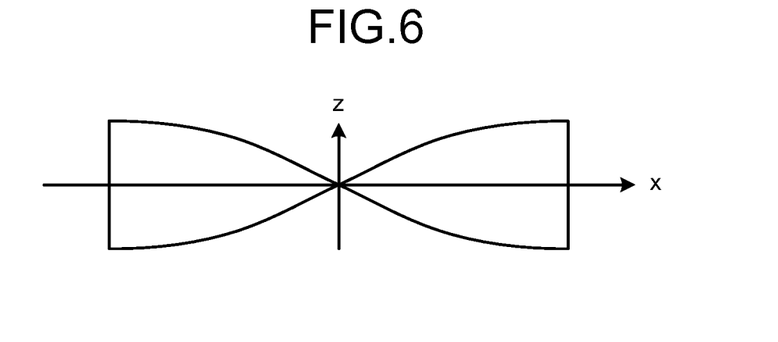
FIG. 6 is a diagram when the second deflecting unit according to the embodiment is viewed down from above.
Figure 7:
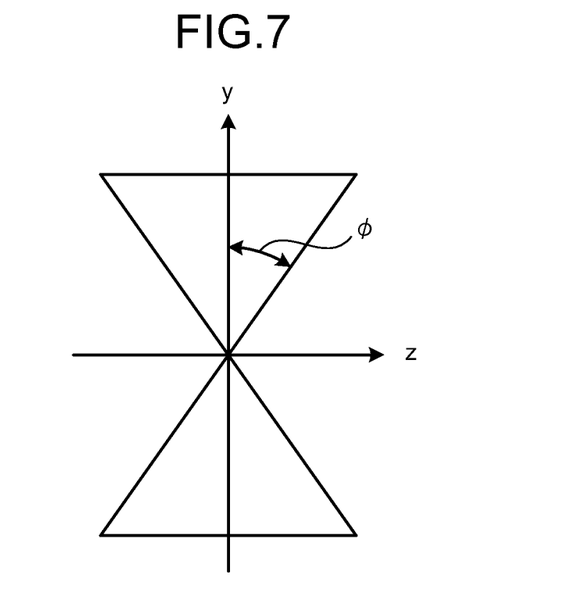
FIG. 7 is a diagram when the second deflecting unit according to the embodiment is viewed from a side.

In the embodiment, the second deflecting unit 30 has a twisted shape obtained by twisting a flat reflecting material. As illustrated in FIG. 4, the second deflecting unit 30 is formed by twisting a flat reflecting material. FIG. 5 is a front view of the second deflecting unit 30. In the example illustrated in FIG. 5, such a position on the top surface (the reflecting surface) of the second deflecting unit 30 at which the normal direction does not change upon being twisted is set as the reference position (the origin); while the torsion axis direction is set as the x-axis, the direction orthogonal to the torsion axis direction is set as the y-axis, and the depth direction of the top surface is set as the z-axis. In FIG. 5, "Q" represents an area along the torsion axis. FIG. 6 is an xz planar view when the second deflecting unit 30 is viewed down from above. FIG. 7 is a yz planar view when the second deflecting unit 30 is viewed from a side. The angle Φ illustrated in FIG. 7 corresponds to the torsional angle of the second deflecting unit 30.

In this example, it is assumed that the original flat reflecting material from which the second deflecting unit 30 is formed (i.e., a non-twisted flat reflecting material) is present on the xy plane, and that the horizontal width (i.e., the width in the x direction of the flat reflecting material) is 2W (x=[−W, W]) and the longitudinal width (the width in the y direction of the flat reflecting material) is 2H (y=[−H, H]). Moreover, when the original reflecting material is twisted, it is assumed that the ends of the mirror rotate by the angle Φ with respect to the y-axis (thus, the torsional angle=Φ). Then, the coordinates of the upper end and the coordinates of the lower end at a position x of the twisted mirror surface can be expressed using Expression (1) given below.

$$\text{upper end} = \left(x, H\sin\frac{x}{w}\Phi, H\cos\Phi\right) \quad (1)$$

$$\text{lower end} = \left(x, -H\sin\frac{x}{w}\Phi, -H\cos\Phi\right)$$

Consequently, the surface shape of the second deflecting unit 30 according to the embodiment can be expressed using Expression (2) given below.

$$\begin{cases} x = x \\ y = (1-2t)H\sin\frac{x}{w}\Phi \\ z = (1-2t)H\cos\frac{x}{w}\Phi \end{cases} \quad (2)$$

In Expression (2), "t" represents a parameter equal to or greater than zero and equal to or smaller than one.

Herein, of the top surface of the reflecting material from which the second deflecting unit 30 is formed, all normal directions of the area along the x-axis (the torsion axis) are coincident with the z-axis direction. However, when the second deflecting unit 30 is formed by twisting the flat reflecting material in the abovementioned manner; then, of the top surface of the second deflecting unit 30, the normal direction of the area Q along the torsion axis keeps changing in a continuous manner (the normal direction only at the reference position is coincident with the z-axis direction). Consequently, for example, of the top surface of the second deflecting unit 30, if the laser light in the second rotation range sequentially falls on the area Q along the torsion axis; then, due to the fact that the normal direction of the area Q keeps changing in a continuous manner, the angle formed between the incident direction of the laser light and the normal direction of the area Q (i.e., the angle of incidence) also changes in a continuous manner (that is, the angle of reflection also changes in a continuous manner). As a result, the second scan plane P2, which indicates the area in which spreads the laser light that has deflected from the second deflecting unit 30, has a gradient equal to the torsional angle Φ.

Figure 8:
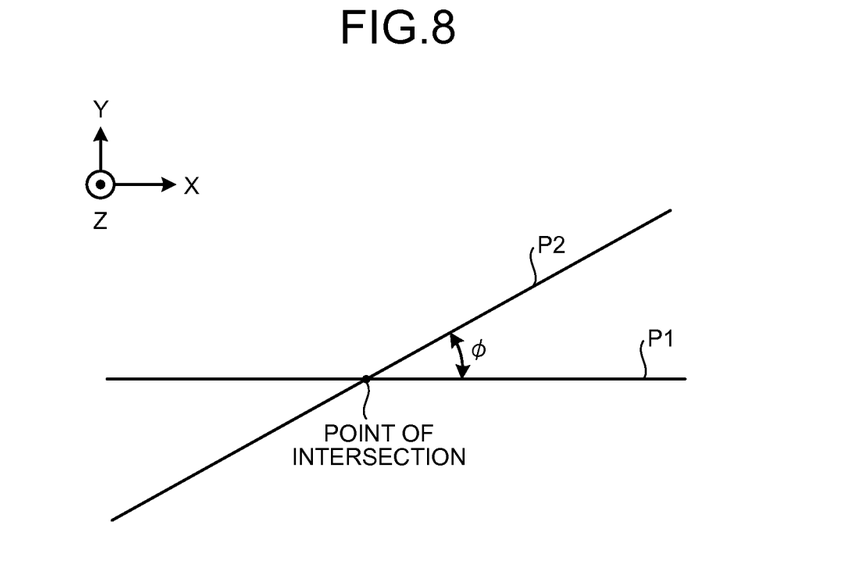
FIG. 8 is schematic diagram illustrating a first scan plane and a second scan plane according to the embodiment.

In the embodiment, as illustrated in FIG. 8, the second deflecting unit 30 is disposed in such a way that the first scan plane P1 and the second scan plane P2 intersect at the angle Φ (=the torsional angle Φ). As a result, it becomes possible to reliably prevent a situation in which the laser light does not fall on the target object present in the Z-axis direction thereby causing omissions in the measurement. FIG. 8 is a diagram illustrating a scan area of the laser light in the XY plane at a distance Z=L. Herein, it is desirable that the position of intersection between the first scan plane P1 and the second scan plane P2 is in the vicinity of the center of the first scan plane P1. However, that is not the only possible case. Alternatively, the first scan plane P1 and the second scan plane P2 can intersect at a position other than the centers or can intersect at different positions. With reference to the example illustrated in FIG. 8, the first deflecting unit 20 and the second deflecting unit 30 are disposed in such a way that the area to which the laser light deflected from the reference position of the second deflecting unit 30 travels corresponds to the point of intersection between the first scan plane P1 and the second scan plane P2.

Figure 9:
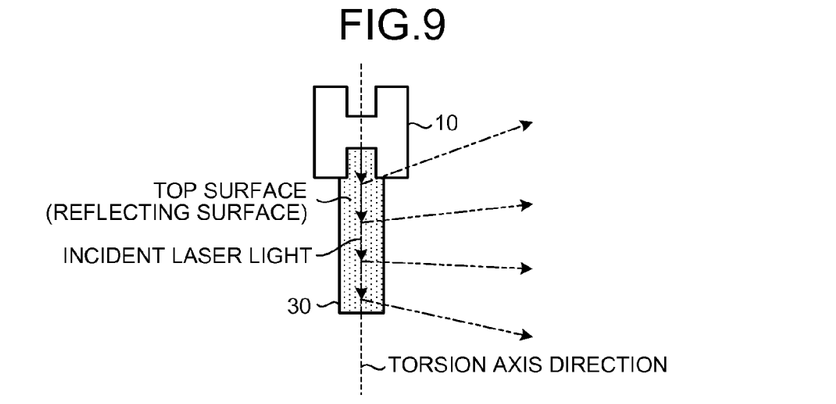
FIG. 9 is a schematic diagram illustrating the laser radar unit and the second deflecting unit according to the embodiment.

FIG. 9 is a schematic diagram illustrating a case when the laser radar unit 10 and the second deflecting unit 30 are viewed from the X-axis direction. As can be understood from FIG. 9, the second deflecting unit 30 is disposed in such a way that the laser light in the second rotation range sequentially falls on the area along the torsion axis on the top surface (the reflecting surface) of the second deflecting unit 30.

Figure 10:
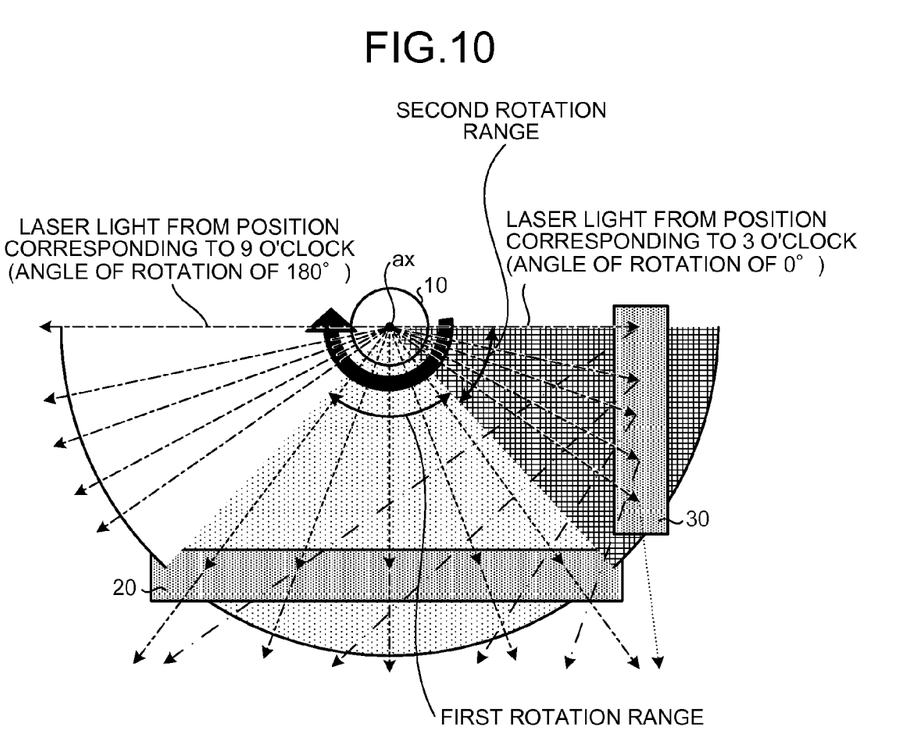
FIG. 10 is a schematic diagram illustrating the laser radar unit, the first deflecting unit, and the second deflecting unit according to the embodiment.

FIG. 10 is a schematic diagram illustrating a case when the laser radar unit 10, the first deflecting unit 20, and the second deflecting unit 30 are viewed from the Z-axis direction (i.e., a schematic diagram illustrating an anterior top view). In the example illustrated in FIG. 10, the laser light is emitted while being rotated in the clockwise direction starting from the position corresponding to 3 o'clock (in the example illustrated in FIG. 10, the position corresponding to the angle of rotation of 0°) toward the position corresponding to 9 o'clock (in the example illustrated in FIG. 10, the position corresponding to the angle of rotation of 180°). In the example illustrated in FIG. 10, the range between the position corresponding to 4:30 (the position corresponding to the angle of rotation of 45°) and the position corresponding to 7:30 (the position corresponding to the angle of rotation of 135°) is set as the first rotation range; while the range between the position corresponding to 3 o'clock and the position corresponding to 4:30 is set as the second rotation range. However, that is not the only possible case. As described above, the laser light in the first rotation range is deflected from the first deflecting unit 20. Then, the laser light that has deflected from the first deflecting unit 20 spreads within the first scan plane P1. Similarly, the laser light in the second rotation range is deflected from the second deflecting unit 30. Then, the laser light that has deflected from the second deflecting unit 30 spreads within the second scan plane P2 that intersects with the first scan plane P1.

Figure 11:
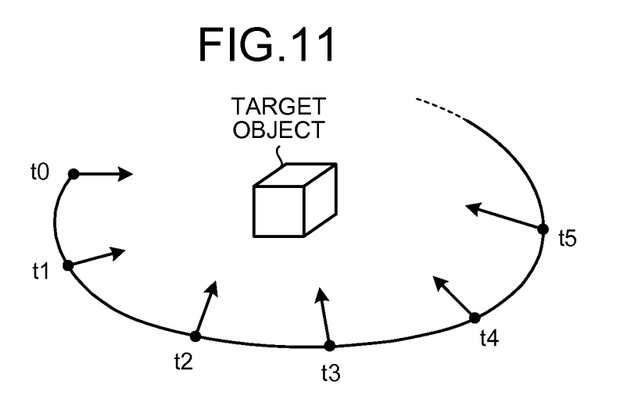
FIG. 11 is a schematic diagram illustrating the measurement performed by a distance measuring device according to the embodiment.

Returning to the explanation with reference to FIG. 1, the generating unit 40 refers to the measurement result obtained by the laser radar unit 10 (the control unit 17) and generates a three-dimensional model of the target object. A more concrete explanation is given below. Herein, for the sake of simplicity in the explanation, the constituent elements other than the generating unit 40 (i.e., the laser radar unit 10, the first deflecting unit 20, and the second deflecting unit 30) in the three-dimensional model generating device 1 are collectively referred to as a "distance measuring device". In the embodiment, as illustrated in FIG. 11, the target object is placed in the center of the measurement direction in which the distance measuring device performs measurement (i.e., the target object is placed in the center of the travelling direction of the laser light used for scanning), and performs measurement while moving the distance measuring device along the outer circumferential direction of the target object. In FIG. 11, each black circle represents a position of the distance measuring device at a particular timing. Then, the generating unit 40 uses the measurement results to generate a three-dimensional model of the target object. In this example, every time the distance measuring device performs measurement at a particular timing, the generating unit 40 obtains a data group indicating the measurement result.

Herein, Dt0 represents a data group that is obtained at a timing t0 while the laser light rotates one revolution. Thus, Dt0 points to the positional coordinates of the target object in the coordinate system in which the position of the distance measuring device at the timing t0 serves as the origin. Herein, a change in the position and the angle of the distance measuring device leads to a change in the coordinate system of the distance measuring device. For that reason, a data group Dt1, which is obtained at a timing t1 at which the next measurement is performed, cannot be treated as the data of the same coordinate system as the coordinate system of the data group Dt0.

In that regard, if the variation in the positions of the distance measuring device or the rotations of the distance measuring device at the timings t0 and t1 is calculated and if the data group Dt1 is converted into the coordinate system of the data group Dt0, then the two data groups can be treated to be of the same coordinate system. The variation in the positions or the rotations of the distance measuring device can be calculated by attaching a gyroscopic instrument or a global positioning system (GPS) to the distance measuring device. Alternatively, a camera can be installed in the distance measuring device, and the variation in the positions or the rotations of the distance measuring device can be calculated by comparing the images captured by the camera at two different timings. Still alternatively, the variation of the distance measuring device can be observed from outside using a sensor such as a camera. Meanwhile, the coordinate system conversion can be achieved by performing a commonly-known correction of rotation or translation. The generating unit 40 converts the coordinate systems of all data groups, which are obtained at a plurality of timings, into the coordinate system of a reference timing, thereby generating a three-dimensional model of the target object.

Herein, in the embodiment, as illustrated in FIG. 8, in the vicinity of the point of intersection between the first scan plane P1 and the second scan plane P2, during a single measurement (during the measurement performed while the laser light rotates one revolution), the same place is measured for a plurality of times. At that time, if a plurality of pieces of data is used to limit the effect of a measuring error, then it becomes possible to enhance the measuring accuracy in the vicinity of the point of intersection.

In the embodiment, the control unit 17 of the laser radar unit 10 measures the distance to the target object, which is present at the point of intersection, on the basis of the following two pieces of data: a first piece of data that indicates the distance to the target object present at the point of intersection, which is obtained based on the amount of time taken since the emission of the laser light that, of the laser light in the first rotation range, is projected on the point of intersection between the first scan plane P1 and the second scan plane P2 up to the detection of the reflected light; and a second piece of data that indicates the distance to the target object present at the point of intersection, which is obtained based on the amount of time taken since the emission of the laser light that, of the laser light in the second rotation range, is projected on the point of intersection between the first scan plane P1 and the second scan plane P2 up to the detection of the reflected light.

Then, an arbitrary method can be implemented to obtain final data (i.e., data that indicates the distance to the target object which is present at the point of intersection) based on the first piece of data and the second piece of data. For example, the average value of the first piece of data and the second piece of data can be obtained as the final data. Alternatively, a weighted average value can be obtained as the final data. Still alternatively, for example, the first piece of data can be selected as the final data, or the second piece of data can be selected as the final data. Still alternatively, for example, from among the first piece of data and the second piece of data, the data obtained at the earlier timing (calculated at the earlier timing) can be selected as the final data. Alternatively, in contrast, from among the first piece of data and the second piece of data, the data obtained at the later timing can be selected as the final data. However, these are not the only possible methods of obtaining the final data based on the first piece of data and the second piece of data.

Figure 12:
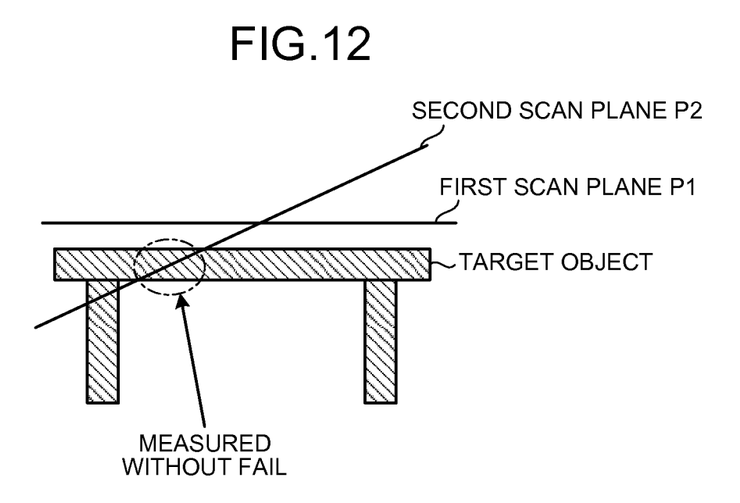
FIG. 12 is a schematic diagram illustrating the measurement of a target object that is present in the vicinity of a point of intersection according to the embodiment.

As described above, in the embodiment, the first deflecting unit 20 is disposed that deflects the laser light, whose emission direction rotates in the first rotation range, within the first scan plane P1, and the second deflecting unit 30 is disposed that deflects the laser light, whose emission direction rotates in the second rotation range, within the second scan plane P2 which intersects with the first scan plane P1. As a result, whatever may be the thickness of the target object that is present in the vicinity of the point of intersection between the first scan plane P1 and the second scan plane P2, that target object is reliably detected (measured) using the laser light spreading in either one of the two scan planes (see FIG. 12). Hence, according to the embodiment, it becomes possible to reliably prevent omissions in the measurement of the target object. That enables obtaining an accurate three-dimensional model.

Figure 13:
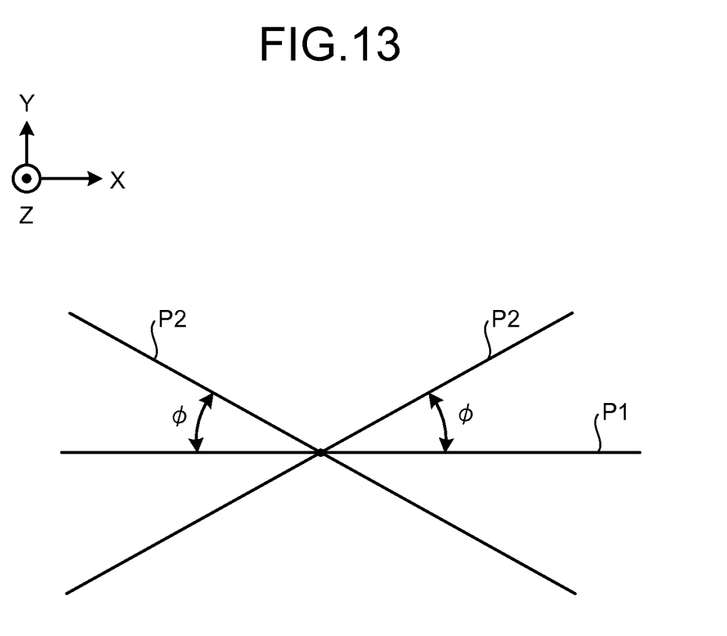
FIG. 13 is a schematic diagram illustrating the first scan plane and a plurality of second scan planes according to a modification example of the embodiment.

In the embodiment, the explanation is given for an example in which only a single second deflecting unit 30 is disposed. However, that is not the only possible case. Alternatively, for example, it is possible to dispose a plurality of second deflecting units 30. For example, two second deflecting units 30 can be symmetrically positioned across the first deflecting unit 20. With that, as illustrated in FIG. 13, each of the two second deflecting units 30 intersects with the first scan plane P1 at the angle Φ. As a result, two different second scan planes P2 are formed that have the same absolute value of the gradient but with opposite signs.

Figure 14:
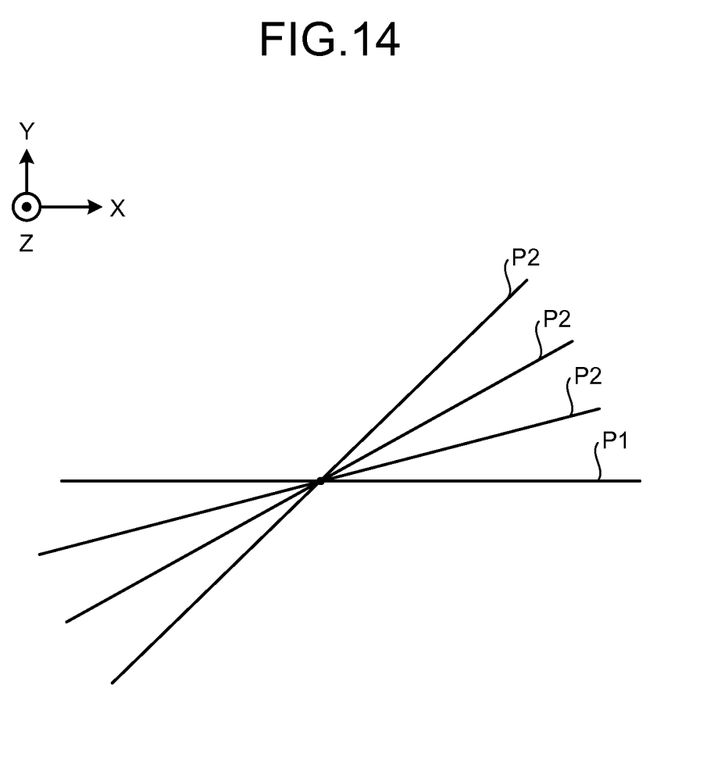
FIG. 14 is a schematic diagram illustrating the first scan plane and a plurality of second scan planes according to another modification example of the embodiment.

Alternatively, for example, as illustrated in FIG. 14, a plurality of second deflecting units 30 having different torsional angles can be disposed in such a way that each second deflecting unit 30 makes a different intersection angle with the first scan plane P1. Still alternatively, it is also possible to combine the configuration illustrated in FIG. 13 and the configuration illustrated in FIG. 14. In this way, by increasing the number of second scan planes P2 that intersect with the first scan plane P1, omissions in the measurement of the target object can be prevented in a more reliable manner.

Meanwhile, the invention can also be applied to a distance measuring device (i.e., in the example described above, the constituent elements other than the generating unit 40 in the three-dimensional model generating device 1) that measures the distance to the target object. Such a distance measuring device can include an emitting unit, a first deflector, a second deflector, a detector, and a measuring unit. The emitting unit has the function of emitting a laser light in such a way that an emission direction of the laser light rotates around a predetermined axis. The first deflector has the function of deflecting the laser light, whose emission direction rotates in a first rotation range, within a first scan plane. The second deflector has the function of deflecting the laser light, whose emission direction rotates in a second rotation range, within a second scan plane that intersects with the first scan plane. The detector has the function of detecting the reflected light when the laser light that has deflected from the first deflector is reflected from the target object or detecting the reflected light when the laser light that has deflected from the second deflector is reflected from the target object. The measuring unit has the function of measuring the distance to the target object on the basis of the amount of time taken since the emission of the laser light up to the detection of the reflected light.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A three-dimensional model generating device comprising:
   an emitting unit configured to emit a laser light in such a way that an emission direction of the laser light rotates around a predetermined axis;
   a first deflector configured to deflect at least a part of the laser light, whose emission direction rotates in a first rotation range, within a first scan plane;
   a second deflector configured to deflect at least a part of the laser light, whose emission direction rotates in a second rotation range, within a second scan plane that intersects with the first scan plane;
   a detector configured to detect a reflected light when the laser light that has deflected from the first deflector is reflected from a target object or detect a reflected light when the laser light that has deflected from the second deflector is reflected from a target object;
   a measuring unit configured to measure a distance to the target object on the basis of the amount of time taken since emission of the laser light up to detection of the reflected light; and
   a generating unit configured to generate a three-dimensional model of the target object by using a measurement result obtained by the measuring unit.

2. The device according to claim 1, wherein the second deflector has a shape obtained by twisting a flat reflecting material.

3. The device according to claim 2, wherein the second deflector is disposed in such a way that the laser light in the second rotation range sequentially falls on an area along a torsion axis on the top surface of the second deflector.

4. The device according to claim 2, wherein a torsional angle of the second deflector is equal to an angle at which the first scan plane and the second scan plane intersect with each other.

5. The device according to claim 2, wherein
   of the top surface of the second deflector, a position at which the normal direction does not change upon being twisted is set as an origin,
   of the top surface of the second deflector, the horizontal direction is set as the x-axis, the vertical direction is set as the y-axis, and the depth direction is set as the z-axis, and
   when 2W represents the width in the x-axis direction of the reflecting material from which the second deflector is formed and when 2H represents the width in the y-axis direction of the reflecting material from which the second deflector is formed, the surface shape of the second deflector is expressed using expressions given below:

$$\begin{cases} x = x \\ y = (1-2t)H\sin\frac{x}{w}\Phi \\ z = (1-2t)H\cos\frac{x}{w}\Phi \end{cases}$$

where t represents a parameter equal to or greater than zero and equal to or smaller than one.

6. The device according to claim 1, wherein the measuring unit measures the distance to the target object present at a point of intersection between the first scan plane and the second scan plane, on the basis of a first piece of data and a second piece of data, the first piece of data indicating a distance to the target object present at the point of intersection, which is obtained based on the amount of time taken since emission of laser light that, of the laser light in the first rotation range, is projected on the point of intersection up to detection of reflected light, and the second piece of data indicating a distance to the target object present at the point of intersection, which is obtained based on the amount of time taken since emission of laser light that, of the laser light in the second rotation range, is projected on the point of intersection up to detection of reflected light.

7. The device according to claim 1, wherein a plurality of the second deflector are disposed.

* * * * *